United States Patent [19]

Ducasse

[11] 4,303,522
[45] Dec. 1, 1981

[54] CONTINUOUS SEPARATION SYSTEM

[76] Inventor: Joseph C. V. Ducasse, 391 Donegal Pl., Martinez, Calif. 94553

[21] Appl. No.: 96,363

[22] Filed: Nov. 21, 1979

Related U.S. Application Data

[63] Continuation of Ser. No. 906,078, May 15, 1978, abandoned.

[51] Int. Cl.³ ............................................. B01D 33/24
[52] U.S. Cl. ................................... 210/297; 210/397; 210/408; 210/456
[58] Field of Search ................................. 127/17–19; 210/297, 396, 397, 400, 406, 456, 391, 408

[56] References Cited

U.S. PATENT DOCUMENTS

| | | | |
|---|---|---|---|
| 701,687 | 6/1902 | Desaulles | 210/396 |
| 1,681,490 | 8/1928 | Lomax | 210/408 X |
| 1,890,251 | 12/1932 | Fowler | 210/400 X |
| 1,914,742 | 6/1933 | Hillier | 210/391 X |
| 1,943,618 | 1/1934 | Moore et al. | 210/456 X |
| 2,042,308 | 5/1936 | Hardy | 210/396 |
| 2,237,635 | 4/1941 | Saxe | 210/400 X |
| 2,636,612 | 4/1953 | Cording, Jr. et al. | 210/396 X |
| 2,802,572 | 8/1957 | Jalkanen | 210/408 X |
| 2,834,721 | 5/1958 | Payne | 210/396 X |
| 2,963,161 | 12/1960 | Holland | 210/401 |
| 3,218,313 | 11/1965 | Blankenship | 210/397 X |
| 3,438,503 | 4/1969 | Carpenter | 210/396 |

Primary Examiner—Robert H. Spitzer
Attorney, Agent, or Firm—Townsend and Townsend

[57] ABSTRACT

A continuous separation system intended for the recovery of solids and/or liquid contained in slurries comprises an enclosed low speed rotary screen assembly mounted between a stationary casing under vacuum and a cover provided with a fixed scraper and into which circulates dry hot air. The arrangement is such that during operation a slurry is admitted on top of the rotating screen on one side of the scraper while liquid is recovered by suction into the casing leaving the solids which are washed and then dried before being scraped off and eventually removed on the other side of the scraper. The recovered liquid is automatically degasified into the casing before being pumped out therefrom. Throughput can be varied either by adjustment of the amount of material being fed into the system, or by varying the speed of rotation of the screen assembly, or both. Provision is made for cleaning the screen during operation.

10 Claims, 5 Drawing Figures

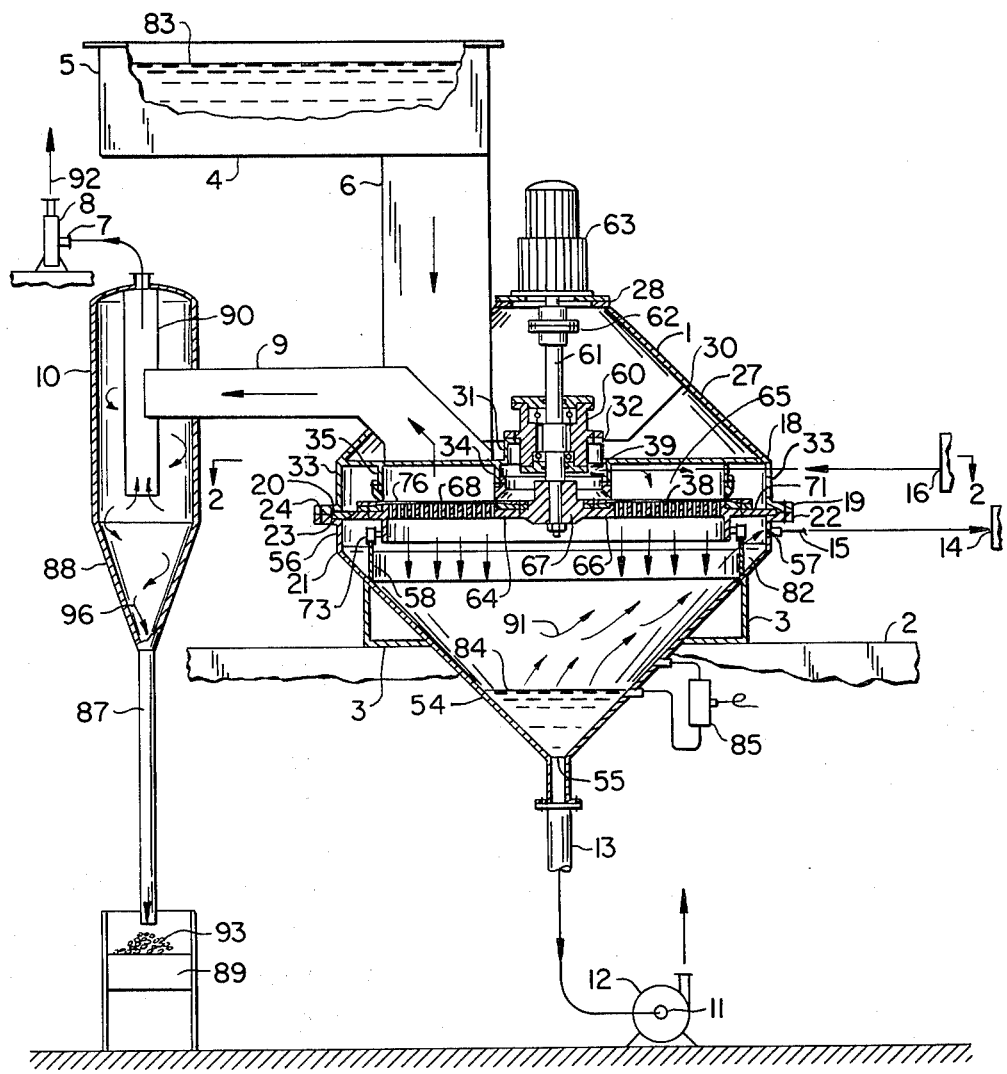
FIG._1.

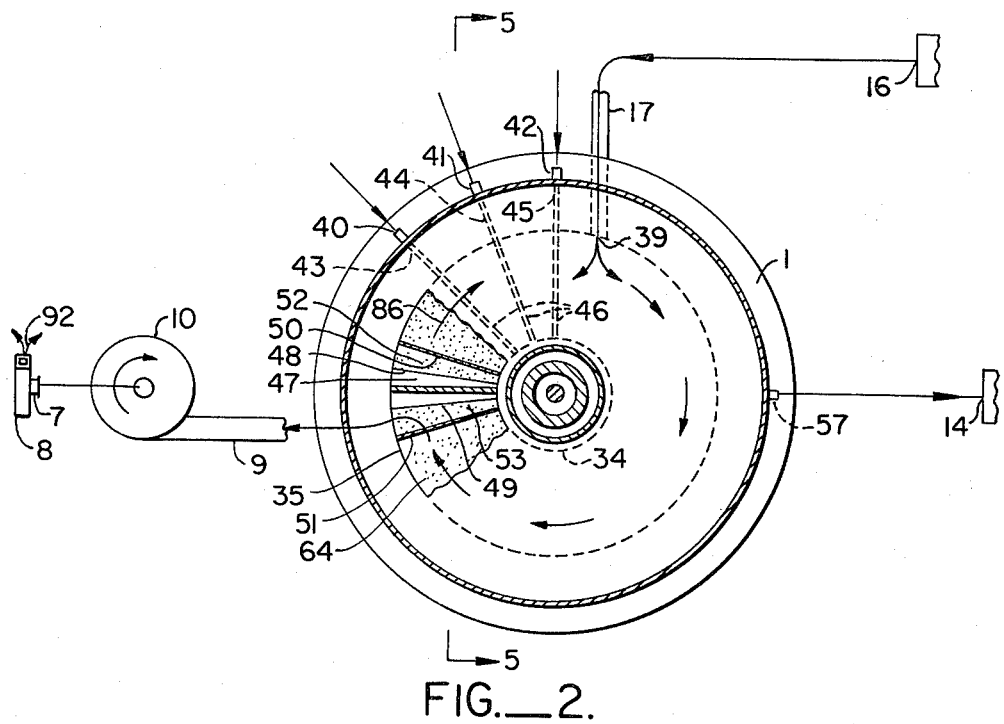
FIG._2.
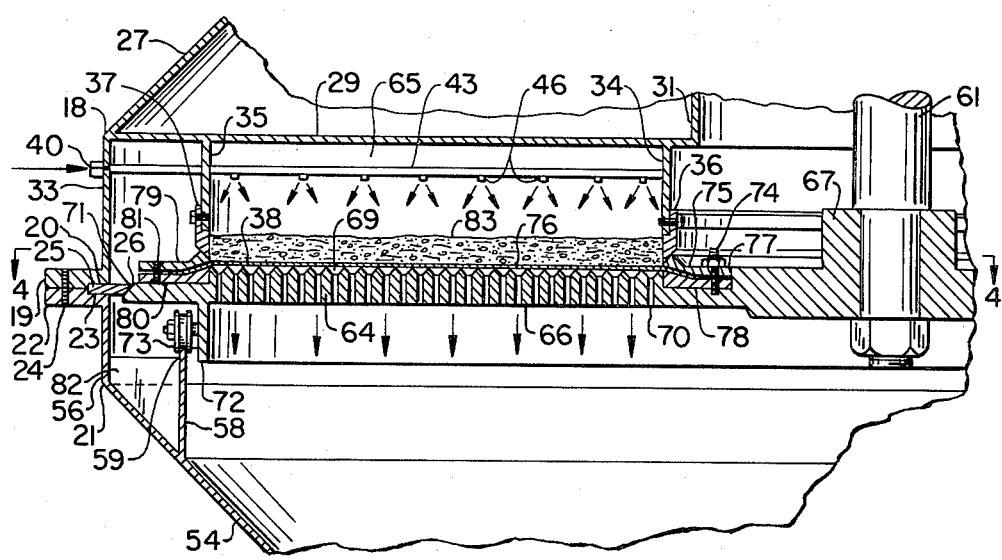
FIG._3.

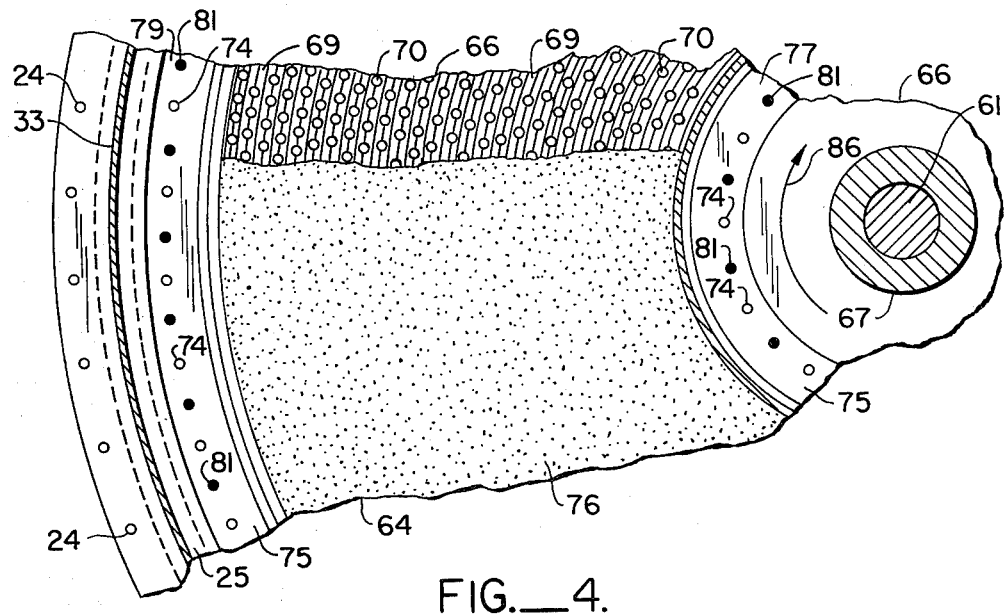
FIG._4.
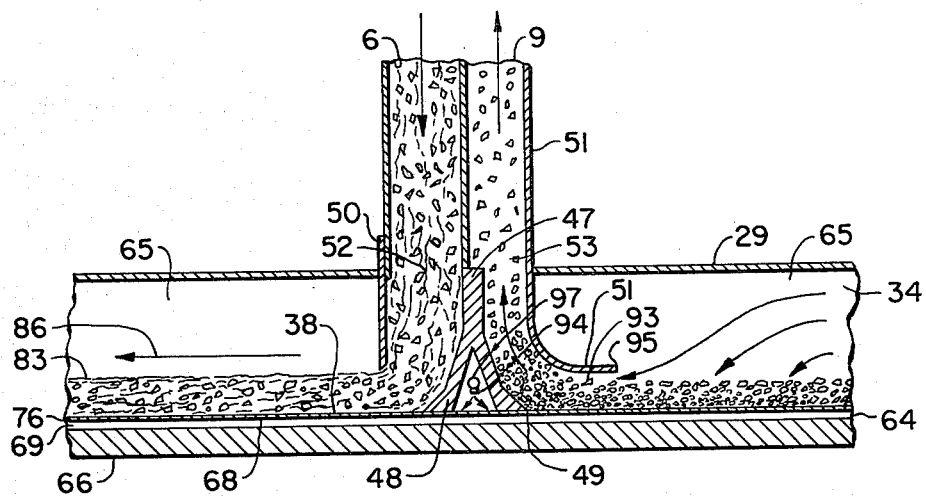
FIG._5.

CONTINUOUS SEPARATION SYSTEM

This is a Continuation of application Ser. No. 906,078, filed May 15, 1978, abandoned.

BACKGROUND OF THE INVENTION

1. Field of the Invention

This invention relates to devices generally used for the continuous separation and recovery of solids and/or liquid contained in slurries, especially those for recovering sugar crystals and molasses from so-called sugar massecuites.

2. Prior Art

So-called centrifugals have long been used and are still being used for separating commercial sugar crystals from molasses. However, this technique has many disadvantages in that, in order to develop the required centrifugal force, the so-called baskets, on which the screens are mounted, rotate at relatively high speeds (usually from 1000 to 1800 rpm), while the power required varies from 50 to 100 hp, thereby necessitating careful dynamic balance of the rotating parts and a sturdy construction of the system.

Furthermore, most of those centrifugals do not operate continuously (those who do have not been, so far, commercially successful, due to sugar crystal breakage and defective separation) in that they have to be stopped for admitting the massecuite and, again, when discharging the sugar crystals, thereby constituting a loss of time.

Recently, however, experiments were carried out with the prototype of a new system adapted for the continuous recovery of commercial sugar crystals and molasses. An application for patent is known to have been originally filed, in France, for protecting the system which, essentially, consists of a filtering belt supported on another perforated belt mounted on pulleys and a casing under vacuum. During operation, the massecuite is fed continuously on top of the filtering belt, while the molasses are recovered into the casing by the suction action of the vacuum and the remaining sugar crystals eventually scraped off and removed from the belt. The molasses are transferred from the casing to a degasifying chamber, before being removed from the system by means of a pump, whereas the sugar crystals (which apparently contain a relatively high percentage of moisture) are sent to a dryer. Reportedly, many problems were encountered during those experiments and which were mainly due to the difficulty in maintaining the required vacuum within the casing, because of the air which was constantly being sucked therein through "cracks" in the sugar layer. The formation of those "cracks" would, apparently, be the result of the inability for a belt to run truly level under such conditions.

SUMMARY OF THE INVENTION

An object of the invention is to provide a new improved continuous separation system of simple design and operation for the recovery of solids and/or liquid contained in slurries, especially sugar crystals and molasses from so-called sugar massecuites.

A particular object of the invention is to provide such a system incorporating devices for continuously washing, drying, scraping and removing the separated solids, as well as for the automatic degasification and removal of the separated liquid, from the system.

Another particular object of the invention is to provide such a system in which separation is effected, through a rigid screen assembly rotating at low speed, by vacuum instead of centrifugal force, thereby requiring less power, sophisticated equipment and labor.

A further object of the invention is to provide such a system in which cleaning of the screen is effected during operation.

Still a further object of the invention is to provide such a system in which the throughput can be varied either by adjustment of the amount of material being fed into the system, or by varying the speed of rotation of the screen assembly, or both.

In accordance with the above invention, a continuous separation system for the recovery of solids and/or liquid contained in slurries, comprises an enclosed low-speed rotary screen assembly mounted between a stationary casing under vacuum and a cover provided with a fixed scraper and into which circulates dry hot air. The arrangement is such that, during operation, a slurry is admitted on top of the rotating screen on one side of the scraper while liquid is recovered by suction into the casing leaving the solids which are washed and then dried before being scraped off and eventually removed on the other side of the scraper. The recovered liquid is automatically degasified into the casing before being pumped out therefrom. Throughput can be varied either by adjustment of the amount of material being fed into the system, or by varying the speed of rotation of the screen assembly, or both. Provision is made for cleaning the screen during operation.

BRIEF DESCRIPTION OF THE DRAWINGS

Other objects and features of the present invention will become apparent from the following description, taken with the following drawings, wherein:

FIG. 1 is an elevation view of an example of a continuous separation system according to the present invention, with the main separator 1 shown in cross section;

FIG. 2 is a plan view of part of the structure shown in FIG. 1, with the main separator 1 shown in cross section taken along line 2—2.

FIG. 3 is an enlarged view of part of the main separator structure shown in FIG. 1;

FIG. 4 is a cross-sectional plan view of the structure shown in FIG. 3, taken along line 4—4.

FIG. 5 is a part-sectional elevation view taken perpendicularly to the radial axis of the scraper 47 shown in FIG. 2, along line 5—5.

DETAILED DESCRIPTION OF THE INVENTION

In the present embodiment illustrated in FIGS. 1 and 2, a continuous separation system is shown comprising a main circular separator 1 supported on a frame 2 by means of pads 3 and connected to:

the bottom 4 of an open overhead tank 5, through a duct 6;

the suction port 7 of a blower 8, through a duct 9, via a so-called cyclone separator 10;

the suction port 11 of a pump 12, through a pipe 13;

a vacuum source 14, through a pipe 15; and a hot air source 16, through a duct 17.

The main separator 1 has a stationary top casing 18 at the bottom of which is a flange 19 provided with an inner peripheral groove 20; and a stationary bottom casing 21 at the top of which is a flange 22 having a corresponding inner peripheral groove 23; both flanges 19 and 22 being bolted together by means of fasteners 24, with a flat so-called teflon seal 25 tightly held horizontally between grooves 20 and 23 and having its inner periphery projecting concentrically toward the axis of separator 1 and provided with a slanted surface 26 facing downwardly.

Casing 18 has an upper conical portion 27 provided at the top with a flange 28 and at the base with a horizontal cover plate 29 firmly held in place at a distance from flange 19 by means of stiffeners 30 and having a central circular plate 31 projecting upwardly, with a flange 32 at the top thereof. Projecting vertically and downwardly from underneath cover plate 29, are an outer ring plate 33 connecting with flange 19, and two concentric circular plates 34 and 35 spaced at a distance from each other and having their respective lower peripheries provided with teflon seal rings 36 and 37 terminating in a common horizontal plane 38 and having slanted surfaces, as shown.

Provided through the wall of outer ring plate 33 are a port 39 connecting with duct 17 and three ports 40, 41, and 42 connecting with outside water and/or steam sources (not shown) and, respectively, with pipes 43, 44, and 45 disposed radially within casing 18 and under cover plate 29, and each provided with a series of nozzles 46 lying within the space included between circular plates 34 and 35 and facing downwardly at a distance from horizontal plane 38.

Disposed radially between plates 34 and 35 and at a distance from each other are a fixed inverted Y shaped scraper 47, the bottom tips 48 and 49 of which lie in plane 38, and two plates 50 and 51, forming ports 52 and 53 which are connected, through conical portion 27, to ducts 6 and 9 respectively. Plate 50 is adjustable vertically, whereas plate 51 has its end 95 curved upwardly away from scraper 47, and located at a suitable height from plane 38, as shown.

Whereas casing 21 has a lower inverted conical portion 54 provided on the outside with pads 3 and at the bottom with port 55 connected to pipe 13, and an upper cylindrical shell 56 extending to flange 22 with a port 57 connected to pipe 15. Within casing 21 and extending upwardly from conical portion 54 is a concentric circular ring 58, rigidly held by stiffeners 82, with its top 59 lying horizontally and at a distance below plane 38.

Within main separator 1 and bolted on top of flange 32 is a box 60 containing a system of bearings and seals through which a central vertical shaft 61 is rotatably mounted with its upper end connected, through a coupling 62, to a variable speed motor 63 vertically mounted on top of flange 28.

At the lower end of shaft 61, and rigidly mounted horizontally thereon, is a circular screen assembly 64 the top of which lies in plane 38, thereby forming an internal annular chamber 65, as shown.

Screen assembly 64 comprises a disc 66 having a central hub 67 and provided at its top surface 68 and on that area facing annular chamber 65, with a series of concentric grooves 69, at the bottom of each of which are drilled a number of holes 70 connecting with the inside of bottom casing 21, and at its outside periphery with a top slanted surface 71 facing slanted surface 26 of seal 25 and bearing snugly thereagainst. At the bottom of disc 66 and extending downwardly is a circular plate 72 at the periphery of which are attached a number of rollers 73 bearing on top 59 of ring 58. Whereas, on top of disc 66 is rigidly mounted, by means of fasteners 74, an annular filter element 75 comprising a finely perforated thin filter plate 76 tightly held between two inner flanges 77 and 78 and two outer flanges 79 and 80 by means of fasteners 81, with both top inner and outer flanges 77 and 79 having slanted surfaces facing respectively those of teflon seals 36 and 37 and bearing snugly thereagainst, as shown. Filter plate 76 has its perforations included in that area facing annular chamber 65, with its top lying in plane 38 and its bottom bearing snugly on top of grooves 69, thus connecting chamber 65 to the inside of bottom casing 21, via holes 70.

The continuous separation system described above operates in the following way:

Motor 63 is started whence screen assembly 64 rotates in direction of arrow 86; vacuum is allowed to build up through port 57, within casing 21 and chamber 65; a slurry 83 (in this case, so-called sugar massecuite, a mixture of molasses and sugar crystals) contained in tank 5 is fed continuously, through port 52, via duct 6, on top of filter plate 76, and across the entire width of chamber 65, with the bottom of plate 50 set at a suitable height above filter plate 76 for limiting the thickness of slurry 83 being deposited thereon.

As soon as slurry 83 reaches the top of filter plate 76, separation starts by molasses being forced down through filter 76, via holes 70, into bottom casing 21, until the molasses reaches a level 84 when pump 12 is started to begin removing the separated molasses from casing 21. As a precautionary measure against air leakage, and in order to assist pump 12, the molasses level 84, within casing 21, is kept at a minimum height, by means of a level controller 85.

Meanwhile, separation continues and is assisted by water and/or steam being admitted (for diluting the molasses and washing the sugar crystals) on top of slurry 83, through nozzles 46, via pipes 43, 44, and 45 (usually water is applied followed by steam). By the time the separated sugar crystals 93, which are retained on top of filter 76, reach the other side of scraper 47, blower 8 is started, while hot air from source 16 is admitted into chamber 65.

A continuous stream of hot air is thus established flowing from source 16 to blower 8, via cyclone separator 10. However, due to the suction action of the vacuum contained within casing 21, part of the hot air is sucked down therein and out through pipe 15, via port 57. Whereas the remainder of the hot air flows on top of separated solids 93, through port 53 and duct 9, via cyclone separator 10 and out through blower 8.

The separated sugar crystals 93, upon nearing tip 49 of scraper 47 are allowed to go under the end 95 of plate 51 prior to being scraped off filter 76 and ultimately entrained with the hot air rushing toward blower 8. However, duct 9 is connected tangentially to cyclone separator 10 such that the sugar crystals are therein subjected to a gyratory action which, assisted by gravity, forces them down cyclone separator 10, in the direction of arrow 96, through a pipe 87, via a cone 88, onto a conveyor 89, while the hot air is exhausted upwardly, via a pipe 90, through blower 8 in direction of arrow 92.

Thus, during operation, scraper 47 has a continuous flow of slurry 83 on one side and one of separated solids 93 on the other, assuring that a layer of the material being processed is constantly sandwiched between the stream of hot air in chamber 65 and screen element 75. This in turn, assures that all the hot air being sucked down into bottom casing 21 must go through that layer of material while assisting either separation or drying.

The hot air introduced into chamber 65 not only assists separation by forcing down the molasses into casing 21, but also continuously dries the sugar crof the following claims. For example, the separated sugar crystals 93 could be removed by means other than those described in the present embodiment.

What I claim is:

1. A continuous separation system for separation of solids and liquid contained in a slurry comprising:
    means defining a stationary bottom casing;
    a horizontal screen assembly disposed above said stationary bottom casing and mounted for rotation relative thereto about a vertical axis, said screen assembly having a liquid previous portion extending over a predetermined radial range;
    means for rotating said screen assembly about said vertical axis;
    a stationary scraper disposed above said screen assembly having a radial extent at least commensurate with said radial range;
    inlet conduit means proximate said stationary scraper on a first side thereof for depositing a continuous slurry layer on top of said screen assembly over substantially all of said radial range such that substantially the entire liquid pervious portion of said screen assembly is covered with said slurry as said screen assembly rotates relative to said inlet conduit means;
    means defining a chamber above said slurry layer;
    outlet conduit means having an intake proximate said screen assembly on the opposite side of said stationary scraper from said inlet conduit means; and
    means for introducing air into said chamber at a pressure above the pressure in said bottom casing and above the pressure in said outlet conduit means, a first portion of said introduced air passing through said slurry layer to displace liquid and to dry solids therein whereupon a portion of said slurry layer consists of substantially dried solids as it approaches said stationary scraper;
    said intake of said outlet conduit means being sized relative to the height of said solids on said screen assembly to receive said solids and to permit a second portion of said introduced air to flow into said outlet conduit means, said second portion entraining said solids, carrying them into said outlet conduit means, and substantially completing the drying thereof while avoiding excessive mechanical handling;
    said stationary scraper, said introducing means, and said outlet conduit means defining together means for removing said solids from said screen assembly and carrying said solids out of said chamber devoid of mechanical removal means.

2. The invention of claim 1 wherein said outlet conduit means is in part defined by said stationary scraper.

3. The invention of claim 2 wherein said inlet conduit means is partly defined by said stationary scraper.

4. The invention of claim 3 wherein said outlet conduit means is disposed vertically in the neighborhood of said scraper such that said entrained solids are initially directed upward away from said screen assembly.

5. The invention of claim 1 also comprising separator means disposed in the path of said entrained solids for precipitating said entrained solids.

6. The invention of claim 1 also comprising vertically adjustable dam means associated with said inlet conduit means for defining a gap above said screen assembly, said gap establishing the thickness of said slurry layer, whereby adjustment of said dam means provides adjustment of said slurry layer thickness.

7. The invention of claim 1 also comprising fixed washing means disposed above a portion of said screen assembly to wash serially adjacent segments of said slurry layer as said segments move from proximate said inlet conduit means to proximate said outlet conduit means.

8. The invention of claim 1 also comprising means for creating a vacuum in said lower casing.

9. A continuous separation system for separation of solids and liquids contained in a slurry comprising:
    a stationary bottom casing;
    a horizontal screen assembly disposed above said stationary bottom casing and mounted for rotation relative thereto about a vertical axis, said screen assembly having an annular liquid pervious portion coaxial about said vertical axis;
    means for rotating said screen assembly about said vertical axis;
    inlet conduit means disposed above said screen assembly for depositing a continuous slurry layer on top of said screen assembly over substantially the entire radial range of said annular pervious portion such that substantially all of said liquid pervious portion of said screen assembly is covered with said slurry as said screen assembly rotates about said vertical axis;
    vertically adjustable dam means associated with said inlet conduit means for defining a gap above said screen assembly, said gap establishing the thickness of said slurry layer;
    means for creating a vacuum within said bottom casing for drawing liquid from said slurry layer through said liquid pervious portion of said screen assembly into said bottom casing;
    a chamber above said screen assembly;
    a radially extending vertical stationary scraper contacting said screen assembly along a generally radial line wherein material on said screen assembly encountering said scraper is initially deflected upward;
    outlet conduit means proximate said scraper for carrying material out of said chamber, said outlet conduit means having an intake proximate said screen assembly on a side of said scraper remote from said inlet conduit means, said intake being sized to receive material on said screen assembly;
    means for creating a reduction in pressure within said outlet conduit means; and
    means for introducing air into said chamber at a pressure above the pressure in said bottom casing and above the pressure in said outlet conduit means so that a first portion of said air passes through said slurry layer to displace liquid into said bottom casing and substantially dry remaining solids;
    said intake of said outlet conduit means being sized relative to the height of material on said screen assembly to permit a second portion of said air to flow into said outlet conduit means and entrain dried solids, carrying them out of said chamber through said outlet conduit means, and substantially complete the drying thereof while avoiding excessive mechanical handling.

10. The invention of claim 9 wherein said inlet conduit means and said outlet conduit means are generally adjacent, and wherein said scraper defines a portion of a common wall between them.

* * * * *